Jan. 17, 1956  D. F. WILCOCK  2,731,305
HIGH SPEED THRUST BEARING STRUCTURE
Filed Sept. 11, 1952  3 Sheets-Sheet 1
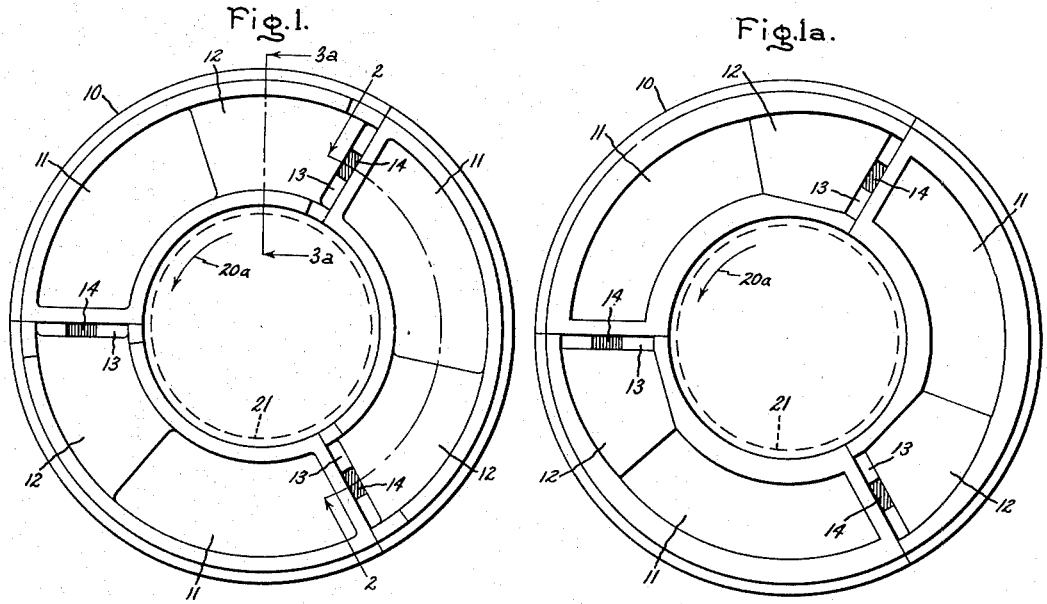
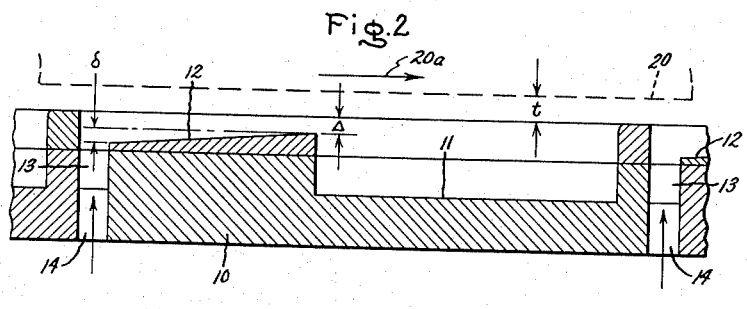
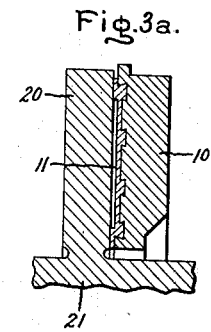
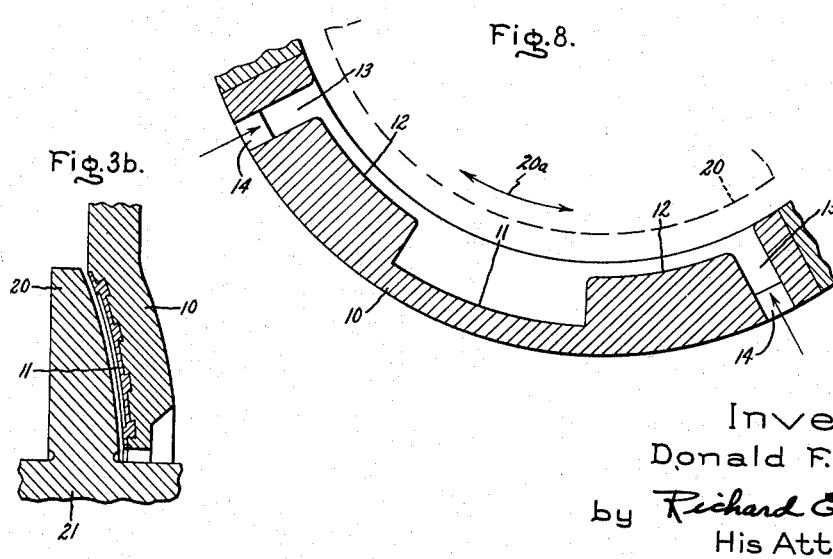
Inventor:
Donald F. Wilcock,
by Richard E. Hosley
His Attorney.

Jan. 17, 1956    D. F. WILCOCK    2,731,305
HIGH SPEED THRUST BEARING STRUCTURE
Filed Sept. 11, 1952    3 Sheets-Sheet 2
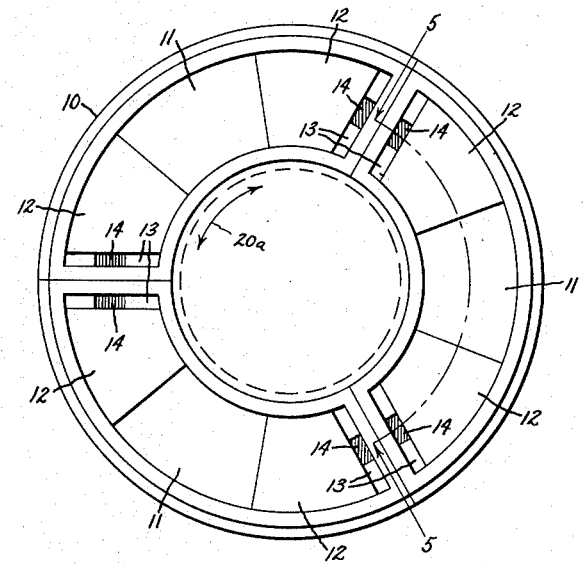
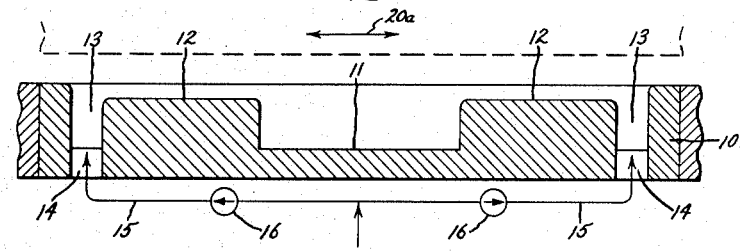
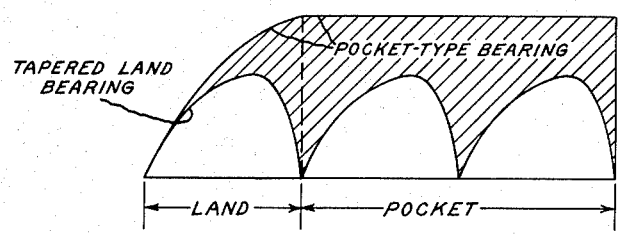
Inventor:
Donald F. Wilcock
by Richard E. Hosley
His Attorney.

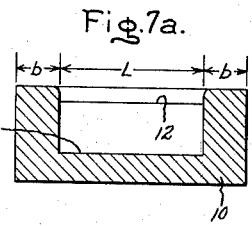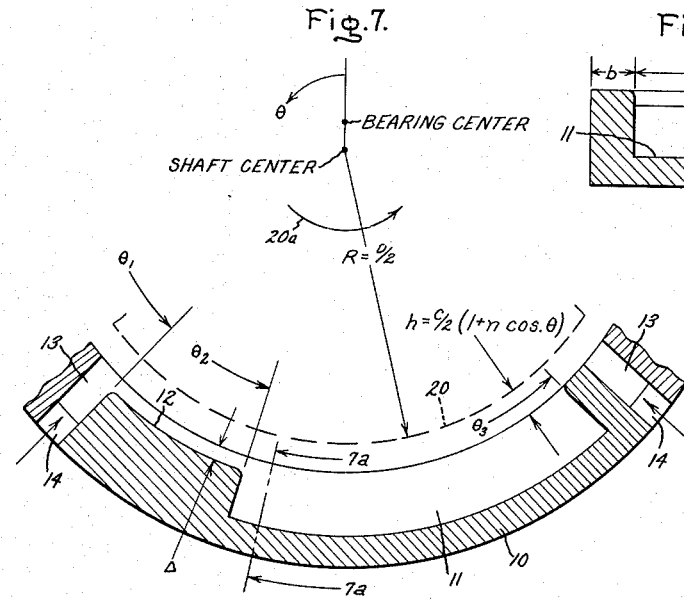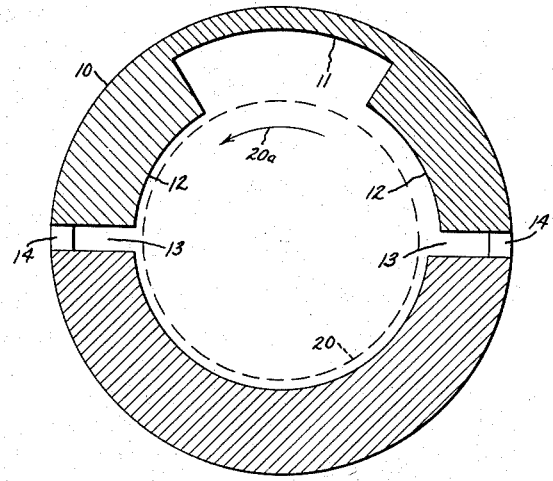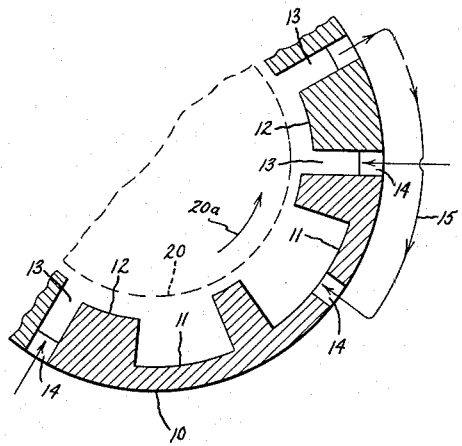

United States Patent Office 2,731,305
Patented Jan. 17, 1956

2,731,305

HIGH SPEED THRUST BEARING STRUCTURE

Donald F. Wilcock, Marblehead, Mass., assignor to General Electric Company, a corporation of New York Application September 11, 1952, Serial No. 308,969

7 Claims. (Cl. 308—73)

This invention relates to bearing structures and specifically to the lubrication of those bearing structures subjected to high loading and high speed, but it is not necessarily limited thereto.

Normally, under conditions of high thrust loading, either a Kingsbury pivoted shoe thrust bearing or a tapered land thrust bearing is used, but in each case, the power loss is quite large, as is the rate of lubricant flow required to maintain a reasonable temperature increase in the bearings, which, with the power loss, arises from the shearing at a high rate of a large area of thin lubricant film.

For similar reasons, the operation of sleeve bearings at high speeds entails large power losses. Above the transition speed resulting in turbulent oil film conditions, the power loss increases even more rapidly with speed because of the effects of turbulence.

A bearing structure having pockets supplied with lubricant by a high pressure pump will operate at a lower power loss and may operate with a lower lubricant flow, but, for successful operation, is wholly dependent upon the reliability of the pump. By my invention, it is contemplated to remove a large fraction of the area subjected to a high shear rate and so reduce the power loss because of the greatly decreased shear over the area of the pockets containing lubricant under pressure for supporting the load, the lubricant pressure being generated within the bearing.

An object of my invention is to provide an improved bearing structure operating at a low power loss and with low lubricant flow without the attendant disadvantages of a separate high pressure lubricant pump.

Another object of my invention is to provide a pocket type bearing in which the required lubricant pressures are self-generated within the bearing.

A further object of my invention is to reduce the power loss in bearings by supporting the load on pressurized lubricant contained in pockets in the bearing.

A still further object of my invention is to provide a completely self-contained bearing, requiring only the normal low-pressure feed, and operating without a circulating system, provided suitable means for cooling the lubricant are installed.

These and other objects of my invention will become more apparent by reference to the following description taken in conjunction with the accompanying drawings which illustrate preferred embodiments of my invention, but it will be understood that other modifications in specific structural details may be made without departing from or exceeding the spirit of the invention.

Referring to the drawings in which like reference numerals indicate like or similar parts:

Fig. 1 is a face view of the contacting surface of a stationary ring of a thrust bearing, for use with a unidirectional rotating shaft;

Fig. 1a is a similar face view of a modification of the invention shown in Fig. 1;

Fig. 2 is a partial development of a section taken along line 2—2 of Fig. 1;

Fig. 3a is a partial longitudinal section through a thrust bearing, using the ring disclosed in Fig. 1, with a radially extending thrust collar, taken aong line 3a—3a of Fig. 1;

Fig. 3b is another partial longitudinal section through a thrust bearing in which the thrust collar or runner on the rotating shaft has an arcuate contour, coacting with a complementary contoured stationary ring having the general pocket configuration of Fig. 1;

Fig. 4 is a face view of the contacting surface of the stationary ring of a thrust bearing for use with a reversible rotating shaft;

Fig. 5 is a partial development of a section taken along line 5—5 of Fig. 4;

Fig. 6 is a generalized diagram of the pressure profiles built up in various types of bearings;

Fig. 7 is an expanded fragment of a cross section through a sleeve bearing embodying my invention;

Fig. 7a is a section taken across the line 7a—7a of Fig. 7;

Fig. 8 is a fragmentary cross section through a sleeve bearing for use with a reversible rotating shaft;

Fig. 9 is a cross section through an anti-whip bearing embodying my invention; and Fig. 10 is a cross section of a modification of my invention illustrating the general application of my structure.

The objects of my invention may be realized by combining a land structure with a pocket type bearing, together with a lubricant supply means, in order to obtain a successfully operating, self-contained bearing of low power loss and low lubricant flow.

In Figs. 1 to 3b of the drawings, the stationary ring member is indicated at 10; against this bears the thrust collar or annular runner member 20 fixed to shaft 21. (See Figs. 3a and 3b.)

The contacting face of ring 10 has a number of relatively deep uniform depressions or pockets 11 of large area thereon which are outlined on three sides by narrow lands of uniform height, these lands providing the bearing surface and minimizing the bearing area on which a thin film of lubricant is subjected to a high shear rate. As shown, the area of the lands is less than 20% of the total area of the bearing surface. On the fourth side, along a radial edge, each of the pockets is defined by a pumping land 12 which is depressed below the level of the bearing surface of the other lands. These pumping lands 12, lead from a lubricant groove 13, supplied by inlet channel 14 from an appropriate source of lubricant (undisclosed here) and they may be either at a constant depth below the bearing surface or taper upwardly toward the pockets as in a tapered land bearing.

The principle of operation of my invention may be illustrated by reference to Fig. 2, showing a flat surface with a single pocket and adjacent pumping land and lubricant groove. A lubricant, such as oil, is dragged from groove 13 over pumping land 12 into pocket 11 by the moving (or rotating) element 20, indicated by dotted lines, the direction of motion being shown by arrow 20a. For the purpose of illustration, the stationary member is indicated as carrying the pockets, but, even though the rotating member carries the pockets, the principle of operation remains unchanged, provided relative motion occurs between the members.

The lubricant leaves the pocket by leakage over the bearing surface of the lands at either of the circumferential edges and at the ends of the pocket, by leakage back along the pumping land and by being carried over the land at the opposite end of the pocket by shearing action of the moving element. These leakage flows are proportional to the pressures built up in the pocket and to the cube of the film thickness, while the shear flows caused by the moving element are independent of the pressure. The film thickness, $t$, will then adjust itself to equilibrium conditions so that the oil flows into and out of the pocket are equal and so that the pressure build-up in the pocket is sufficient to carry the load imposed on the bearing. If desired, the effects of side leakage from the pumping land may be minimized by tapering the side walls in the direction of motion as indicated in Fig. 1a. Likewise, small relief passages (not shown) may be made at the ends of the lubricant grooves to accommodate the leakage flow from adjacent high pressure pockets.

The principle of my invention may be illustrated further by considering the pressure profile in the direction of motion along the pumping land of either a fixed taper or variable taper type of thrust bearing. Solution of hydrodynamic equations will give a pressure profile for the land in the ordinary tapered land bearing as shown in Fig. 6, the pressure at the ends of the land being zero. By means of my invention, the pressure at the end of the land is maintained at a high value and the pressure profile becomes the upper curve of Fig. 6. By retaining this pressure generated by the pumping land in a pocket of large area, a tremendous advantage in load supporting capacity, indicated by the crosshatched area, is obtained, without the attendant power loss from shearing a thin oil film over a continuous area of bearing surface and consequently the need for a large area of contact is eliminated.

I have discovered how to determine the proportions and dimensions of my bearing so that the optimum film thickness will be obtained under the desired conditions of speed and load as evidenced from the following mathematical analysis. The nomenclature used is as follows:

W—Gross thrust load, lbs.
A—Gross area, sq. in.
P—Average unit load, p. s. i.$=W/A$
$p_2$—Pressure in pocket
$p$—Pressure in oil film over pumping land
$x$—Distance along pumping land in direction of motion measured from oil groove
B—Length of pumping land in direction of motion
L—Width of pumping land
N—Shaft speed, R. P. M.
$R_m$—Mean radius of bearing, in.
U—Mean surface velocity of runner, in./sec.
Q—Oil flow, G. P. M.
$b$—Width of land surrounding pocket, in.
$t$—Film thickness over lands, in.
$h$—Film thickness over pumping land, in.
$\Delta$—Depression of end of pumping land below leakage lands, in.
$\delta$—Taper of pumping land, in.
$\mu$—Oil viscosity, lb. sec./in.$^2$
$w$—Effective perimeter of leakage land, in.
H—A constant
E—Length of pocket in direction of motion, in.
$h_1$—Film thickness at beginning of pumping land
$h_2$—Film thickness at end of pumping land The oil flow into the pocket is:

$$Q_{in} = \frac{ULh_2}{2} - \frac{Lh_2^3}{12\mu}\frac{dp}{dx} \quad (1)$$

in which the first term represents the flow in the direction of motion caused by shear, and the second term represents the flow in the reverse direction caused by the pressure gradient, $dp/dx$.

The oil flow out of the pocket is:

$$Q_{out} = \frac{ULt}{2} + \frac{wp_2 t^3}{12\mu b} \quad (2)$$

in which the first term represents the shear flow out of the pocket at the end opposite the pumping land, and the second term represents the viscous flow over the lands caused by the pressure gradient $p_2/b$. Leakage over the lands at the sides of pumping land is accounted for in an approximate manner by including in $w$ half the side distance along the pumping lands.

Since the flows in and out of the pocket must be equal for equilibrium, (1) and (2) may be combined to give:

$$\frac{dp}{dx} = \frac{6\mu U}{h_2^2} - \frac{1}{h_2^3}\left[6\mu Ut + \frac{wp_2 t^3}{bL}\right] \quad (3)$$

Conditions of continuity of flow require that $Q_{in}$ be constant along the pumping land, so that $h_2$ may be replaced by $h$ and (3) becomes:

$$\frac{dp}{dx} = \frac{6\mu U}{h^2} - \frac{1}{h^3}\left[6\mu Ut + \frac{wp_2 t^3}{bL}\right] \quad (4)$$

To solve the differential equation (4), I note that $h$ is a function of $x$, namely, $$h = t + \Delta + \delta - \frac{x\delta}{B} \quad (5)$$

so that, $$dx = -\frac{B}{\delta}dh \quad (6)$$

Substituting (6) in (4) and integrating, $$p = \frac{6\mu UB}{\delta h} - \frac{B}{2\delta h^2}\left[6\mu Ut + \frac{wp_2 t^3}{bL}\right] + C_1 \quad (7)$$

where $C_1$ is a constant of integration. The boundary conditions are:

$$p = 0 \text{ when } h = h_2 + \delta$$
and
$$p = p_2 \text{ when } h = h_2$$

Using these boundary conditions the following equation is obtained from (7) after simplification:

$$\frac{p_2}{6\mu UB} = \frac{1}{h_2(h_2+\delta)} - \frac{2h_2+\delta}{h_2^2(h_2+\delta)^2}\frac{t}{2} + \frac{wp_2 t^3}{12bLU\mu} \quad (8)$$

With $p_2$, $\mu$, U, B, L, $b$ and $w$ assumed constant for a given bearing, equation (8) expresses the relationship between $t$, $h_2$ and $\delta$.

It is desirable to find the values of $h_2$ and $\delta$ which will give the maximum film thickness, $t$, and this may be done by setting the partial derivatives of $t$ with respect to $h_2$ and $\delta$ equal to zero and solving the resultant equations, from which, after equating them to each other, it can be shown that:

$$\delta(1+h_2) = 0 \quad (9)$$

Thus either $\delta=0$ or $h_2=-1$, and the solutions are:

(a) $\quad \delta = 0 \qquad h_2 = \sqrt{\dfrac{2\mu UB}{p_2}} \quad$ (maximum)

(b) $\quad \delta = 2-\sqrt{1+H} \quad h_2 = -1 \quad$ (minimum)

and (c) $\quad \delta = 2+\sqrt{1+H} \quad h_2 = -1 \quad$ (minimum)

where $$H = \frac{6\mu UB}{p_2}$$

These solutions represent two minimum and a maximum value for the cubic equation (8) in $t$. Solutions (b) and (c) have no physical meaning for the bearing, and the desired solution is (a).

Thus for the maximum film thickness at a given speed and load, the taper of the pumping land should be zero. Equation (8) now becomes:

$$\frac{wp_2}{12bLU\mu}(t_{max})^3 + \frac{1}{2}t_{max} = \frac{1}{3}\sqrt{\frac{2\mu UB}{p_2}} \quad (10)$$

After determining $t_{max}$ from (10), the necessary design dimension, $\Delta$, is given by:

$$\Delta = h_2 - t_{max} = \sqrt{\frac{2\mu UB}{p_2}} - t_{max} \quad (11)$$

With $\Delta$ determined from (11), values of the film thickness for other values of H are obtained by solving (8) which with δ=0 becomes:

$$(t+\Delta)^3+\frac{wB}{bL}t^3=\frac{6\mu UB\Delta}{p_2}=H\Delta \quad (12)$$

With dimensions fixed and viscosity constant, the film thickness $t$ is a function of $N/P$.

A typical example to illustrate the application of formula (12) above to a thrust bearing as shown in Fig. 1 for given conditions of load and speed is as follows: A thrust bearing to support 67,000 lbs. of thrust and having an outer diameter of 13" and an inner diameter of 7" operates at a speed of 6,000 R. P. M. In this bearing there are three lubricant pockets, each having a length E of 6", and the length of the pumping land 4". With a width of lands, $b$, equal to ¼" the width of the pumping land, L, equals 2½". A lubricant viscosity, $\mu$ of $2.6\times10^{-6}$ lb. sec./in.² is assumed.

Under the assumed conditions the area of the pocket is as follows: Since the pressure across the width of the lands $b$ reduces from pocket pressure to zero at the outer width, the effective width of the pocket equals $L+b$ or 2¾". Additionally, since the pressure of the lubricant across the pumping land from its inlet to its outlet varies from zero to the pocket pressure, the effective length of the pocket is $E+B/2+b/2$ or 8⅛". Therefore, the effective area of the three pockets is 67 sq. in.

With a thrust load of 67,000 lbs. to be supported by the lubricant in the pockets, pressure $p_2$ of the lubricant in the pockets will be 1,000 p. s. i. It is equally apparent that other loads and other dimensions of E, $b$, B and L will result in correspondingly different pressures in order to support the load.

With the assumed outer and inner diameters of the bearing, the mean radius $R_m$ is 5". Thus, at a speed of 6,000 R. P. M. the relative linear speed, U, between bearing members 10 and 20 is 3,140 in./sec.

The effective perimeter, $w$, which is the perimeter around the effective area of the pocket, is equal to $2E+L+B+2b$ or 19".

Substituting these values into formula (12) above, the relationship, to three significant figures, of $$(t+\Delta)^3+202t^3=1.96\times10^{-4}\Delta$$

is obtained. Thus, values of $\Delta$ may be obtained which will result in real values of $t$ for the particular bearing under consideration. However, in order to maintain heating and power losses to a low figure, a relatively large film of lubricant $t$ on the narrow lands surrounding pockets 11 is required. If a film of lubricant, $t$, of the order of 1.2 mils is provided, reasonable values of heating and power losses are obtained. With this film thickness, it can be determined from formula (12) above that the value of $\Delta$ must be approximately 5 mils to provide the necessary input flow of lubricant to maintain this film thickness. It will be apparent that for larger film thicknesses, $\Delta$ must be larger.

Not only is my invention particularly applicable to the usual form of thrust bearings as shown in Fig. 3a, but it can be used also with a modified ball seat structure as shown in Fig. 3b, wherein an arcuate surface pocket type thrust collar cooperates with a shaft runner having an arcuate contour, the numbering being the same in both figures.

My invention may be adapted readily to give equal load carrying capacity for either direction of rotation by the design shown in Figs. 4 and 5. In this case where reversible shaft motion occurs, a pumping land is provided at either end of the lubricant pocket, with the lubricant grooves fed by conduit means containing check valves permitting the lubricant to enter the grooves but not to leave them by way of the conduit means. Referring specifically to Figs. 4 and 5, the bearing face 10 carries a number of pockets 11 outlined along the circumferential edges by bearing surfaces of uniform height. The radial edges of the pockets are defined by pumping lands 12 depressed below the bearing surfaces and leading from lubricant grooves 13 supplied by inlet channels 14 from conduit means 15 containing check valves 16 permitting lubricant to enter the grooves 13 but not to leave them through the conduit means. The power loss in this modification will be somewhat greater than for the structures disclosed in Figs. 1 to 3b inclusive due to the additional pumping lands, but otherwise there is no change in mode of operation.

My invention may also be applied to journal bearings as illustrated in Figs. 7 to 10 inclusive wherein the numbering is the same as that of the preceding figures, the bearing being indicated at 10, supporting the journal 20, and having pockets 11, pumping lands 12, lubricant grooves 13 and inlet channels 14.

Fig. 7 is the particular adaptation of my invention disclosed in Figs. 1 and 2 applied to a journal bearing supporting a unidirectional rotating shaft, as indicated by the arrow 20a therein.

The application of the principle of my invention may be illustrated by reference to Figs. 7 and 7a, showing a single pocket with adjacent pumping land and lubricant groove.

Oil is carried by motion of the journal from the oil groove 13 over the pumping land 12 into the pocket 11. It will be noted that the pumping land 12 is depressed by an amount $\Delta$ below the top surface of the bearing. As discussed previously for the thrust bearing, oil leaves the pocket by leakage over the lands at either side and at the ends of the pocket, by leakage back along the pumping land and by being carried over the land at the opposite end of the pocket by the motion of the journal. Also, the leakage flows are proportional to the pressure built up in the pocket, while the shear flows caused by the motion of the journal are independent of pressure. The journal will ride at a position where the pressure built up in the pocket is sufficient to carry the imposed load, the film thickness $h$, and hence the pocket leakage being a function of the journal position.

The mathematical relations elucidating this principle of journal bearing construction are developed in the following paragraphs. The notation used is as follows:

R—Journal radius inches
D—Journal diameter, inches
$h$—Oil film thickness, inches
$n$—Journal eccentricity, dimensionless
$\Delta$—Depression of pumping land, inches
$b$—Width of lands bounding pocket, inches
L—Width of pocket, inches
N—Journal speed, R. P. M.
V—Surface velocity of journal, in./sec.
$\theta$—Angle measured in direction of rotation from line of centers, radians (Fig. 7)
$\theta_1$—Angle to leading edge of pumping land
$\theta_2$—Angle to trailing edge of pumping land
$\theta_3$—Angle to end of pocket
$\theta_{12}$—Angle to center of pumping land, ½ ($\theta_1+\theta_2$)
$\mu$—Oil viscosity, lb. sec./in.²
Q—Oil flow, cu. in./sec.
$p$—pressure, p. s. i.
$p_2$—Pressure in pocket It will be noted that a constant depth, $\Delta$, of the pumping land below the bearing surface has been indicated. In the most general case some taper of this surface would be assumed. However, in the case of flat surfaces, it has been shown above that optimum results are obtained when the taper is zero. In the case of a sleeve bearing the various attitudes the journal may take and the greater simplicity of construction as well as analysis when using a zero taper may dictate its use. It is not my intention, however, to restrict my invention to this particular case but rather to use it as an example.

Except in the special case where the journal and bearing centers coincide, the film thickness along the boundaries of the pocket is a variable, and this must be considered in computing the leakage from the pocket. The flow from the two sides of the pocket is:

$$Q_s = 2\int_{\theta_2}^{\theta_3} \frac{h^3 p_2 R d\theta}{12\mu b} \quad (1)$$

But $$h = \frac{C}{2}(1 + n \cos \theta) \quad (2)$$

so that $$Q_s = \frac{p_2 R C^3}{48\mu b}\int_{\theta_2}^{\theta_3} (1 + n \cos \theta)^3 d\theta \quad (3)$$

Denoting the integral by $I_{23}$ $$Q_s = \frac{p_2 R C^3 I_{23}}{48\mu b} \quad (4)$$

The leakage from the sides of the pumping land may be calculated in the same manner, assuming for the sake of simplicity a linear pressure rise along the land:

$$Q_L = \frac{p_2 R C^3}{48\mu b}\int_{\theta_1}^{\theta_2} \frac{(\theta - \theta_1)(1 + n \cos \theta)^3 d\theta}{(\theta_2 - \theta_1)^2} \quad (5)$$

Denoting the integral by $I_{12}$ $$Q_L = \frac{p_2 R C^3 I_{12}}{48\mu b} \quad (6)$$

The flow into the pocket over the pumping land is $$Q_{in} = \frac{VL(h_2 + \Delta)}{2} - \frac{(h_2 + \Delta)^3 p_2}{12\mu R(\theta_2 - \theta_1)} \quad (7)$$

again assuming a linear pressure distribution along the pumping land, i. e., that $(\Delta + h)$ is a constant.

Equating flows into and out of the pocket, $$\frac{VL(h_2 + \Delta)}{2} = \frac{(h_2 + \Delta)^3 p_2}{12\mu R(\theta_2 - \theta_1)} + \frac{p_2 R C^3}{48b\mu}(I_{12} + I_{23}) + \frac{h_3^3 p_2 L}{12\mu b} + \frac{VLh_3}{2} \quad (8)$$

the last two terms representing the flow out of the end of the pocket. Equation (8) may be solved for the pocket pressure as follows:

$$p_2 = \frac{\pi b D^2 N \mu (\theta_2 - \theta_1)(h_2 - h_3 + \Delta)}{20b(h_2 + \Delta)^3 + 10D(\theta_2 - \theta_1)h_3^3 + \frac{5D^2 C^3}{4L}(\theta_2 - \theta_1)(I_{12} + I_{23})} \quad (9)$$

in which, $$h_i = \frac{C}{2}(1 + n \cos \theta_i) \quad (10)$$

The optimum value of $\Delta$ may be obtained by trial and error or by setting $$\frac{dp_2}{d\Delta} = 0$$

It will be apparent that the principle of the pocket and pumping land may be applied to sleeve bearings in many ways other than that disclosed in Fig. 7 above, as, for example, in Figs. 8, 9 and 10.

The structure of Fig. 8 applies the principle to a journal bearing supporting a reversible rotating shaft in a manner similar to the modification of Figs. 4 and 5.

Fig. 9 is a particular adaptation of my invention to an anti-whip bearing for shafts carrying light loads. The shaft is indicated at 20 supported in bearing 10 which has a conventional cylindrical lower half. The upper half of the bearing comprises a pumping land and pocket as described previously, with lubricant supply grooves at the horizontal centerline. This embodiment of the invention will produce stabilizing forces which act on shaft 20 in a manner similar to that described in my U. S. Patent 2,584,770, with the same assignee as this application.

The pumping lands need not be adjacent to the pockets to which they furnish the high pressure lubricant and may be situated at other points of the bearing circumference if desirable, being connected to the pocket by a suitable duct. These lands may also be tapered or constructed with no taper at all.

Fig. 10 illustrates a journal bearing for carrying heavy loads at high speeds with low power loss with such a typical construction. The unidirectional rotating shaft is indicated at 20, with the bearing at 10, the pockets at 11, pumping lands at 12, lubricant grooves at 13, inlet channels at 14 and a cross connecting duct at 15.

The principle of my invention comprising the use of a lubricant pocket preceded by a pumping land has no relation to the number of pockets used, but for reasons of stability, it may be desirable to have at least three pockets. Neither is it my desire to restrict this invention to pumping lands of zero taper, even though zero taper gives the optimum film thickness.

Although a preferred embodiment and modifications of my invention have been shown and described, it will be readily understood by those skilled in the art that variations may be made in the disclosed structures without departing from the basic features of my invention. It is desired that my disclosure be considered illustrative and inclusive of all modifications and variations which may fall within the true scope of the appended claims and not limitative to the exact construction therein.

What I claim as new and desire to secure by Letters Patent of the United States is:

1. In a bearing, a moving member having a bearing contacting surface, a stationary member having a bearing contacting surface for contacting said moving member bearing contacting surface, projections on one of said contacting surfaces extending toward the other of said contacting surfaces and defining a series of recesses thereon, said series of recesses comprising a relatively deep pocket for receiving a pressurized lubricant, a groove for providing lubricant for said pocket and a pumping land between said groove and said pocket, said pumping land being at a constant depth below the top surface of said projections, said depth being obtained from the relation $$\Delta = \sqrt{\frac{2\mu U B}{p_2}} - t_{max}$$

where $\mu$ is the oil viscosity, $U$ is the mean surface velocity of the moving member, $B$ is the length of pumping land in the direction of motion measured from the oil groove, $p_2$ is the pocket pressure and $t_{max}$ is the lubricant film thickness determined from the relationship that $$\frac{wp_2}{12bLU\mu}(t_{max})^3 + \frac{t_{max}}{2} = 1/3\sqrt{\frac{2\mu U B}{p_2}}$$

where $w$ is the effective perimeter of the leakage land, $b$ is the width of the land surrounding the pocket and $L$ is the width of the pumping land.

2. A bearing for carrying heavy loads at low power loss comprising a stationary member adapted for attachment to a housing for said bearing, a second member capable of transmitting load forces movable relative to said stationary member, lubricant inlet means connected with said bearing for providing a load supporting lubricant between adjacent bearing surfaces arranged on each of said members, one of said bearing surfaces comprising narrow lands forming a pocket, and high pressure generating means connected with said pocket and operable upon relative movement of said members to pressurize said lubricant for delivery to said pocket and between said bearing surfaces at a value corresponding to the load transmitted to said stationary member by said second member.

3. A bearing for carrying heavy loads at low power loss comprising a stationary member adapted for attachment to a housing for said bearing, a load transmitting member movable relative to said stationary member and having a bearing surface positioned adjacent a bearing surface on said stationary member, the bearing surface of said stationary member comprising lands defining a plurality of pockets, pumping means bridging said lands and connected with said pockets, and lubricant inlet means on said bearing for supplying lubricant to said pumping lands so that relative rotation of said members causes said pumping lands to pump lubricant to said pockets and bearing surface at a pressure equal to the load transmitted by said load transmitting member.

4. A bearing for carrying heavy loads at low power loss comprising a stationary member adapted for attachment to a housing for said bearing, a load transmitting member movable relative to said stationary member and having a bearing surface arranged to coact with a bearing surface on said stationary member for effecting the transmission of load to the latter, one of said bearing surfaces comprising narrow lands forming a plurality of pockets depressed below the surface of said lands, a pumping land extending between said narrow lands and positioned in an end of each of said pockets, and lubricant inlet means connected with each of the pumping lands so that upon relative movement of said members, the pumping lands cooperate with the other bearing surface to pump a lubricant at a pressure into said pockets and between said bearing surfaces sufficient to carry the load transmitted by the load transmitting member to the stationary member.

5. The bearing according to claim 4 wherein said pumping lands are wider at the leading edge than at the trailing edge.

6. A bearing for carrying heavy loads at low power loss comprising a stationary member adapted for attachment to a housing for said bearing and a load transmitting member movable relative to said stationary member for transmitting a load thereto, said members presenting mutually coacting bearing surfaces, one of said bearing surfaces comprising narrow lands forming a plurality of pockets depressed below the bearing surface, pumping lands positioned in opposite ends of each of said pockets and arranged to bridge said narrow lands forming the respective ends of the pockets, lubricant inlet means adapted for connection to said pumping lands, said pumping lands in one end of said pockets cooperating with the other bearing surface upon relative rotation of said members in one direction to supply a lubricant under pressure to their respective pockets and between said coacting bearing surfaces and the other said pumping lands in the other end of said pockets being operable upon relative rotation of said members in the other direction to provide a lubricant under pressure to their respective pockets and between said coacting bearing surfaces at a value sufficient to carry the load transmitted by said load transmitting member to said stationary member.

7. A bearing for carrying heavy loads at low power loss comprising a stationary member adapted for attachment to a housing for said bearing and a load transmitting member movable relative to said stationary member for transmitting a load thereto, said members presenting mutually coacting bearing surfaces, the bearing surfaces of said stationary member having a portion comprising lands defining a pocket, pumping lands in opposite ends of said pocket extending the width of said pocket and being positioned between the pocket defining lands, lubricant inlet means connected with said pumping lands so that upon relative rotation of said members in one direction said pumping land pressurizes lubricant from said inlet and pumps it to said pocket and between said bearing surfaces and upon relative movement of said members in the other direction, the other pumping land pressurizes lubricant from said inlet and pumps it into said pocket and between said bearing surfaces at a value sufficient to carry the load transmitted by said load transmitting member to said stationary member.

References Cited in the file of this patent

UNITED STATES PATENTS

| 1,675,641 | Christman | July 3, 1928 |
| 2,062,250 | Moller | Nov. 24, 1936 |
| 2,155,455 | Thoma | Apr. 25, 1939 |

FOREIGN PATENTS

| 141,750 | Great Britain | June 10, 1920 |
| 539,753 | Great Britain | Sept. 23, 1941 |
| 996,515 | France | Dec. 20, 1951 |